July 4, 1933.  T. T. SCOTT  1,917,068
FURNACE
Filed Nov. 13, 1930    2 Sheets-Sheet 1

INVENTOR.
Thomas T. Scott
BY
ATTORNEY.

July 4, 1933.  T. T. SCOTT  1,917,068
FURNACE
Filed Nov. 13, 1930  2 Sheets-Sheet 2

INVENTOR.
Thomas T. Scott.
BY
ATTORNEY.

Patented July 4, 1933

1,917,068

UNITED STATES PATENT OFFICE

THOMAS T. SCOTT, OF FAIRMOUNT, MISSOURI, ASSIGNOR TO SHEFFIELD STEEL CORPORATION, OF KANSAS CITY, MISSOURI, A CORPORATION OF DELAWARE

FURNACE

Application filed November 13, 1930. Serial No. 495,440.

This invention relates to a combined gas and oil furnace of regulator type, and constitutes an improvement on Patent No. 1,703,460 issued to the present applicant on February 26, 1929.

The principal object of this invention is to provide a furnace adapted for various uses, and in particular for melting scrap and other iron in the production of steel. Another object is to construct a furnace which utilizes both fuel gas and crude oil in the operation.

It is a further object of this invention to attain a more perfect mixture of the gas with the entering air, so that complete combustion will take place, the gas burning over the entire surface of the hearth.

In carrying out the invention, the apparatus deemed to be best suited for the purpose is shown in the drawings, in which.

Figure 1:
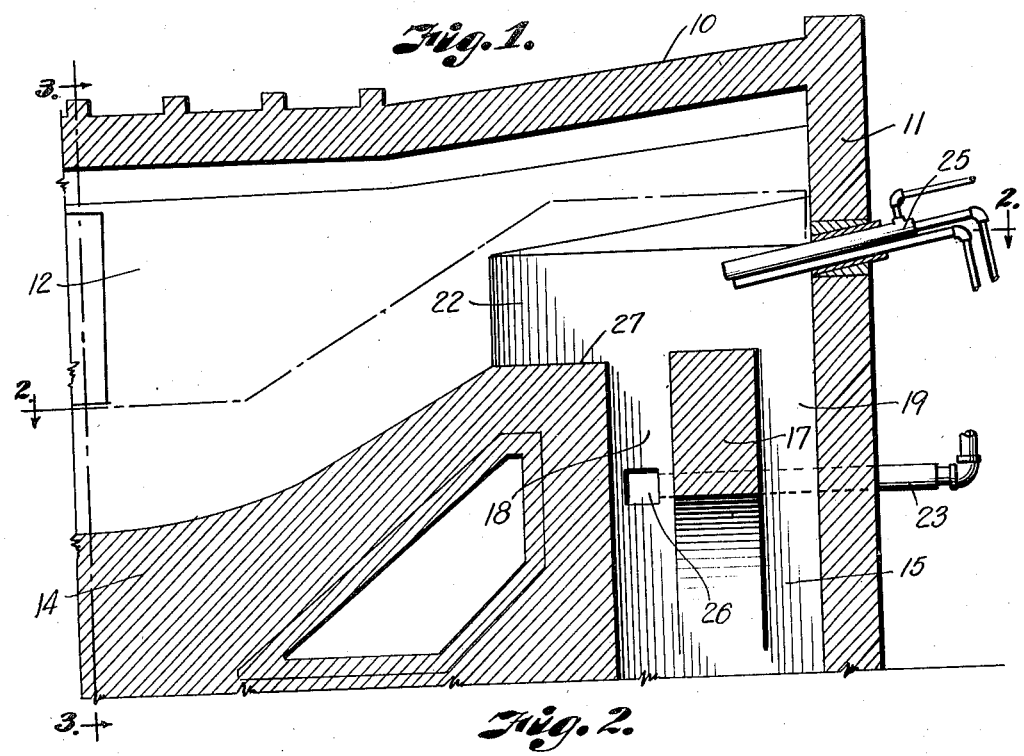
Fig. 1 represents a longitudinal sectional view through the center of the furnace showing only one-half of the furnace and one burner construction.
Figure 2:
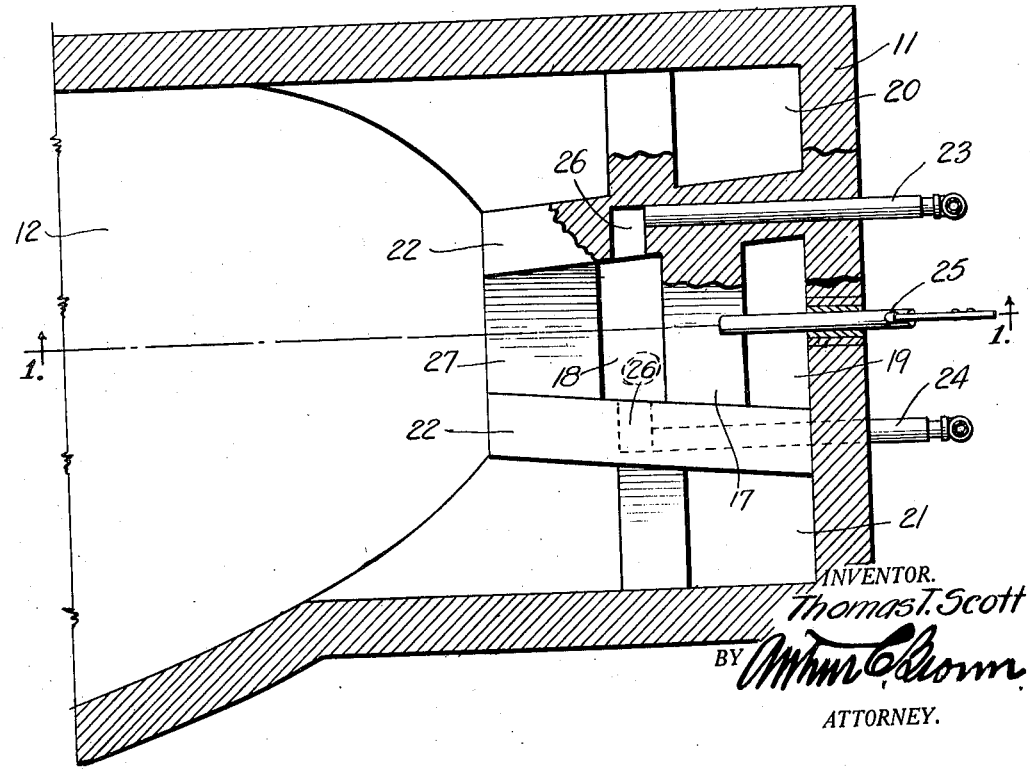
Fig. 2 is a section on the line 2—2 of Fig. 1 with a part thereof broken away to more clearly illustrate the gas intake.
Figure 3:
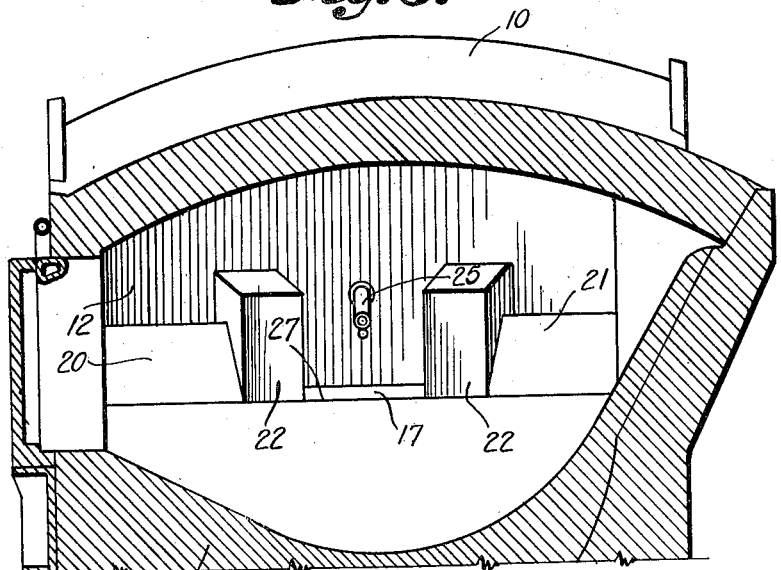
Fig. 3 is a section on the line 3—3 of Fig. 1 looking in the direction of the arrows.

In the drawings, in which like numerals indicate like parts throughout the several views, the furnace has a roof 10, end walls 11 and side walls 12 which enclose the hearth 14.

The air passageway 15 leads to the usual checker chambers and ash collectors (not shown). In the air passageway 15 there is located an arched partition 17 dividing the air passageway into two parts 18 and 19 and causing the stream of air coming up said passageway 15 to be divided between the passages 18 and 19.

Air likewise comes up the side passages 20 and 21 and over the guide walls 22 to mix with the burning oil.

Inlets 23 and 24 for fuel gas lead into the passage 18 through the ports 26. The ports 26 are spaced considerably below the top 27 of the hearth 14 for the purpose of allowing the fuel gas to thoroughly mix with the entering air before coming in contact with the flame of the oil burner 25. It is well known that fuel gas takes a considerable time to become thoroughly mixed with air so that it will support complete combustion. The purpose of placing the port 26 below the top 27 of the hearth is to allow the gas ample opportunity to mix before ignition takes place. This is a salient point in the present invention.

The temperatures generated in a furnace of this type are of necessity extremely high, running considerably more than 3000° F. These temperatures are quite sufficient to burn almost any object they come in contact with, and result in extensive rebuilding and relining of the furnace at short intervals.

Figure 4:
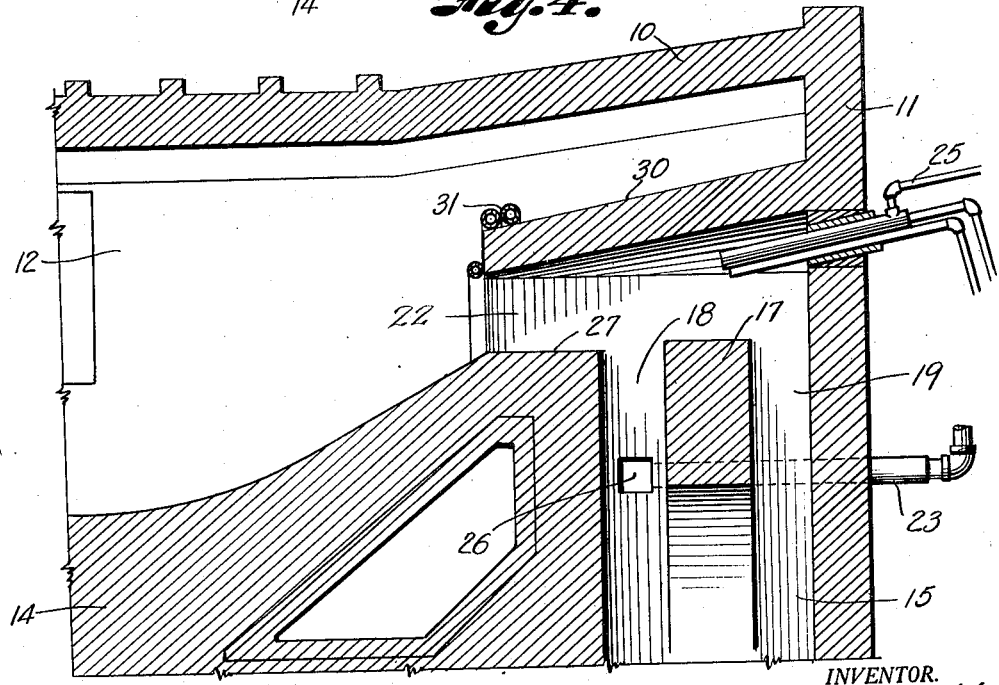
Fig. 4 is a modification of the device shown in Fig. 1, the view being taken on the same plane as Fig. 1.

The modification of the present invention shown in Fig. 4 reduces both the loss of heat incurred in furnaces and the burning effect on the furnace itself. In the said modification, there is provided besides the oil burner 25, gas inlets 23 and 24 and ports 26, and air passages 18 and 19, a hood 30 which covers the area directly over the oil inlet 25 and between the guide walls 22. The hood not only conserves seat but likewise directs the flame more accurately over the entire breadth of the hearth. To prevent burning of the hood and guide walls 22, the cooling pipes 31 are parallel to the hood and guide walls and carry water to reduce the temperature of the said walls and hood. This prevents any undue burning of these members.

The operation of the furnace is similar to that of the ordinary oil or gas burning furnace, in that the metal to be reduced is placed in the hearth 14 and the furnace started, using the burner at one end thereof and throwing a flame over the top of the metal, the burnt gases making their escape through the air passageway 15 at the opposite end of the furnace and through the checker chamber (not shown). When one checker chamber has become thoroughly heated the blast is reversed and the flame directed over the metal from the opposite end of the furnace. Thus air taken into the flame is preheated in passing through the checker chamber and a much hotter flame produced in this manner than can ordinarily be obtained.

The furnace can be used either as a combined gas and oil burning furnace as herein described, or gas and oil may be used separately to suit the convenience of the fuel supply.

It is realized that this invention is susceptible to many modifications falling well within the skill of one versed in the art, and it is, therefore, not desired to limit it to the particular form shown herein but only by the scope of the appended claims.

What is claimed as new and desired to secure by Letters Patent is:

1. In a combined oil and gas burning furnace, a hearth, an oil burner above said hearth, an air passage leading to said oil burner, a partition in said air passage dividing said air passage into two parts, and a gas inlet in one of said parts.

2. In a combined oil and gas burning furnace, a hearth, an oil burner, an air passage leading to said oil burner having a partition therein dividing said air passage into two parts, and a gas inlet leading into one of said parts below the upper level of said hearth.

3. A furnace including side and end walls, a roof and a hearth enclosed thereby, an upwardly extending air passageway formed in said furnace, means for introducing fuel gas into said passageway, means for introducing fuel oil into said furnace above said passageway, and inwardly extending converging guide walls located within said furnace and on opposite sides of said passageway.

4. In a furnace including a hearth and side and end walls, and a roof enclosing the same, an air passageway formed in said furnace adjacent an end wall and intermediate the side walls, means for admitting fuel gas to said passageway, means extending through said end wall for admitting fuel oil to said furnace, converging guide walls located on opposite sides of said air passageway and extending inwardly from said end wall, and air passageways formed in said furnace adjacent said end wall and located outside of said guide walls.

5. A furnace including side and end walls, a roof and a hearth enclosed thereby, an air passageway formed in said furnace, means for introducing fuel gas into said air passageway, means for introducing fuel oil into said furnace above said passageway, inwardly extending converging walls located within said furnace on opposite sides of said passageway, and a hood supported by said guide walls.

6. In a furnace including a hearth and side and end walls and a roof enclosing the same, an air passageway formed in said furnace adjacent an end wall and intermediate the side walls, means for admitting fuel gas to said passageway, means extending through said end wall for admitting fuel oil into said furnace above said passageway, converging guide walls located on opposite sides of said air passageway and extending inwardly from said end wall, air passageways formed in said furnace adjacent said wall and located outside of said guide walls, and a hood supported by said guide walls.

7. A furnace including side and end walls, a roof and a hearth enclosed thereby, an upwardly extending air passageway formed in said furnace and terminating above the hearth, means communicating directly with the air passageway at a point below the hearth for delivering gas fuel directly to an air stream delivered through said passageway for mixture therewith, and means extending through a wall of the furnace adjacent the upper end of the air passageway and above the hearth for introducing a fuel oil into said furnace across the path of the air and gas mixture.

8. A furnace including side and end walls, a roof and a hearth enclosed thereby, an upwardly extending air passageway formed in said furnace and terminating above the hearth, means communicating directly with the air passageway at a point below the hearth for delivering gas fuel directly to an air stream delivered through said passageway for mixture therewith, means extending through a wall of the furnace adjacent the upper end of the air conduit at a point above the hearth and in a direction to introduce a fuel oil into said furnace across the path of the air and gas mixture, and guide walls at opposite sides of said passageway and extending toward the hearth for confining said fuels as they are mixed for discharge across the hearth.

9. A furnace including side and end walls, a roof and a hearth enclosed thereby, an oil burner extending through a wall of the furnace and directed to discharge downwardly across said hearth, an air passageway formed in the furnace adjacent the hearth and spaced from the discharge end of said burner in a direction toward said hearth, and means directly communicating with said passageway at a distance below the burner to deliver a gas for mixture with air discharged through said passageway so that the gas unites with the air to form a combustible mixture before the air and gas stream contacts the discharge from said oil burner.

10. A furnace including side and end walls, a roof and a hearth enclosed thereby, spaced partition walls extending between an end wall and the hearth to form a central vertically arranged primary air passageway and vertically arranged secondary air passageways at the sides of the primary air passageway, means directly communicating with the primary air passageway for introducing a gas fuel into said passageway, means for introducing fuel oil into said furnace across the discharge from the primary air passageway, and guide walls at opposite sides of said primary air passageway and extending toward the hearth for confining said fuels as they are combusted and discharged across the hearth for mixture with secondary air admitted through said secondary air passageways.

11. A furnace including side and end walls, a roof and a hearth enclosed thereby, spaced partition walls extending between an end wall and the hearth to form a central vertically arranged primary air passageway and vertically arranged secondary air passageways at the sides of the primary air passageway, means directly communicating with the primary air passageway for introducing a gas fuel into said passageway, means for introducing fuel oil into said furnace across the discharge from the primary air passageway, guide walls at opposite sides of said primary air passageway and extending toward the hearth for confining said fuels as they are combusted and discharged across the hearth for mixture with secondary air admitted through said secondary air passageways, and a hood bridging across the top of said guide walls.

In testimony whereof I affix my signature.

THOMAS T. SCOTT.